US012154110B2

(12) United States Patent
van Kooten

(10) Patent No.: US 12,154,110 B2
(45) Date of Patent: Nov. 26, 2024

(54) CLASSIFYING TRANSACTIONS IN A WEB SERVICE ENVIRONMENT

(71) Applicant: ADP, Inc., Roseland, NJ (US)

(72) Inventor: Vincent van Kooten, Capelle aan den Ijssel (NL)

(73) Assignee: ADP, Inc., Roseland, NJ (US)

( * ) Notice: Subject to any disclaimer, the term of this patent is extended or adjusted under 35 U.S.C. 154(b) by 179 days.

(21) Appl. No.: 17/651,364

(22) Filed: Feb. 16, 2022

(65) Prior Publication Data
US 2023/0259934 A1    Aug. 17, 2023

(51) Int. Cl.
*G06Q 20/40* (2012.01)
*G06N 20/00* (2019.01)
*G06Q 20/02* (2012.01)

(52) U.S. Cl.
CPC .......... *G06Q 20/401* (2013.01); *G06N 20/00* (2019.01); *G06Q 20/027* (2013.01)

(58) Field of Classification Search
None
See application file for complete search history.

(56) References Cited

U.S. PATENT DOCUMENTS

| | | | | |
|---|---|---|---|---|
| 10,949,432 | B1* | 3/2021 | Grayson | G06F 16/9035 |
| 11,488,110 | B2* | 11/2022 | Newman | G06Q 10/1091 |
| 2006/0229896 | A1* | 10/2006 | Rosen | G06Q 10/1053 |
| | | | | 705/321 |
| 2011/0137946 | A1* | 6/2011 | Siress | G06F 21/6218 |
| | | | | 707/E17.005 |
| 2019/0129701 | A1* | 5/2019 | Hawrylo | G06F 8/71 |
| 2019/0129712 | A1* | 5/2019 | Hawrylo | G06F 8/20 |
| 2020/0004564 | A1* | 1/2020 | Calegari | G06F 9/453 |
| 2020/0302396 | A1* | 9/2020 | Xiao | G06Q 10/067 |
| 2020/0402156 | A1* | 12/2020 | Maitra | G06Q 40/02 |
| 2021/0133894 | A1* | 5/2021 | Reses | G06N 20/00 |
| 2022/0092056 | A1* | 3/2022 | Sekar | G06Q 10/10 |
| 2022/0414709 | A1* | 12/2022 | Tietzen | G06Q 30/0246 |
| 2023/0186308 | A1* | 6/2023 | Babu | G06Q 20/108 |
| | | | | 705/44 |

FOREIGN PATENT DOCUMENTS

WO    WO-2019087008 A1 *   5/2019    ............ G06F 16/27

OTHER PUBLICATIONS

Credits and debits on the Internet, IEEE 1997 (Year: 1997).*
A Survey of Payment Card Industry Data Security Standard, IEEE, 2010 (Year: 2010).*

* cited by examiner

*Primary Examiner* — Bruce I Ebersman
(74) *Attorney, Agent, or Firm* — Foley & Lardner LLP

(57) ABSTRACT

A method, apparatus, system, and computer program code for classifying a transaction. A computer system receives an authorization request from a gateway. The authorization request includes data for a transaction that is pending at a web client. A context for accessing a web service is determined from the authorization request, and the computer system accesses web services data according to the context that was determined. The computer system classifies the transaction based on the web services data, and records the transaction in a ledger according to the context.

21 Claims, 10 Drawing Sheets

CLASSIFYING TRANSACTIONS IN A WEB SERVICE ENVIRONMENT

BACKGROUND

1. Field

The disclosure relates generally to an improved computer system and, more specifically, to a method, apparatus, computer system, and computer program product for classifying transactions in a web service environment.

Machine learning involves using machine learning algorithms to build machine learning models based on samples of data. The samples of data used for training referred to as training data or training data sets. Machine learning models trained using training data sets and make predictions without being explicitly programmed to make these predictions. Machine learning models can be trained for a number of different types of applications. These applications include, for example, medicine, healthcare, speech recognition, computer vision, or other types of applications.

These machine learning algorithms can include supervised machine learning algorithms and unsupervised machine learning algorithms. Supervised machine learning can train machine learning models using data containing both the inputs and desired outputs.

SUMMARY

According to one embodiment of the present invention, a method provides for classifying a transaction. The method comprises: receiving an authorization request from a gateway, wherein the authorization request includes data for a transaction that is pending at a web client; determining, from the authorization request, a context for accessing a web service; accessing web services data according to the context that was determined; classifying the transaction based on the web services data; and recording the transaction in a ledger according to the context.

According to another embodiment of the present invention, a computer system comprises a hardware processor and a classification system in communication with the hardware processor. The classification system executes program code to perform a method for classifying transactions comprising: receiving an authorization request from a gateway, wherein the authorization request includes data for a transaction that is pending at a web client; determining, from the authorization request, a context for accessing a web service; accessing web services data according to the context that was determined; classifying the transaction based on the web services data; and recording the transaction in a ledger according to the context.

According to yet another embodiment of the present invention, a computer program product comprises a computer-readable storage media with program code stored on the computer-readable storage media for classifying a transaction. When executed, the program code instructs a computer system to perform a method of: receiving an authorization request from a gateway, wherein the authorization request includes data for a transaction that is pending at a web client; determining, from the authorization request, a context for accessing a web service; accessing web services data according to the context that was determined; classifying the transaction based on the web services data; and recording the transaction in a ledger according to the context.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
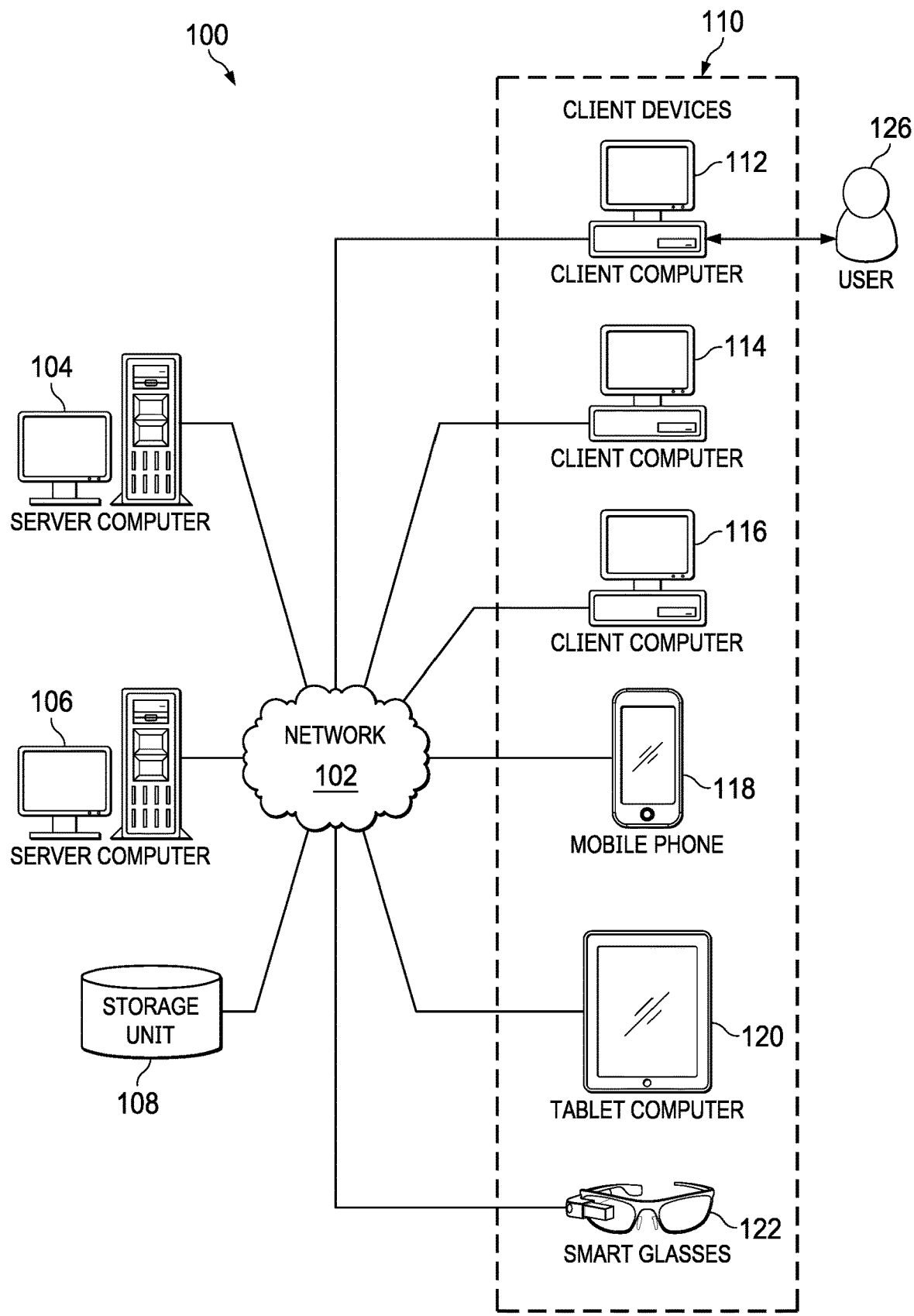
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, the program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
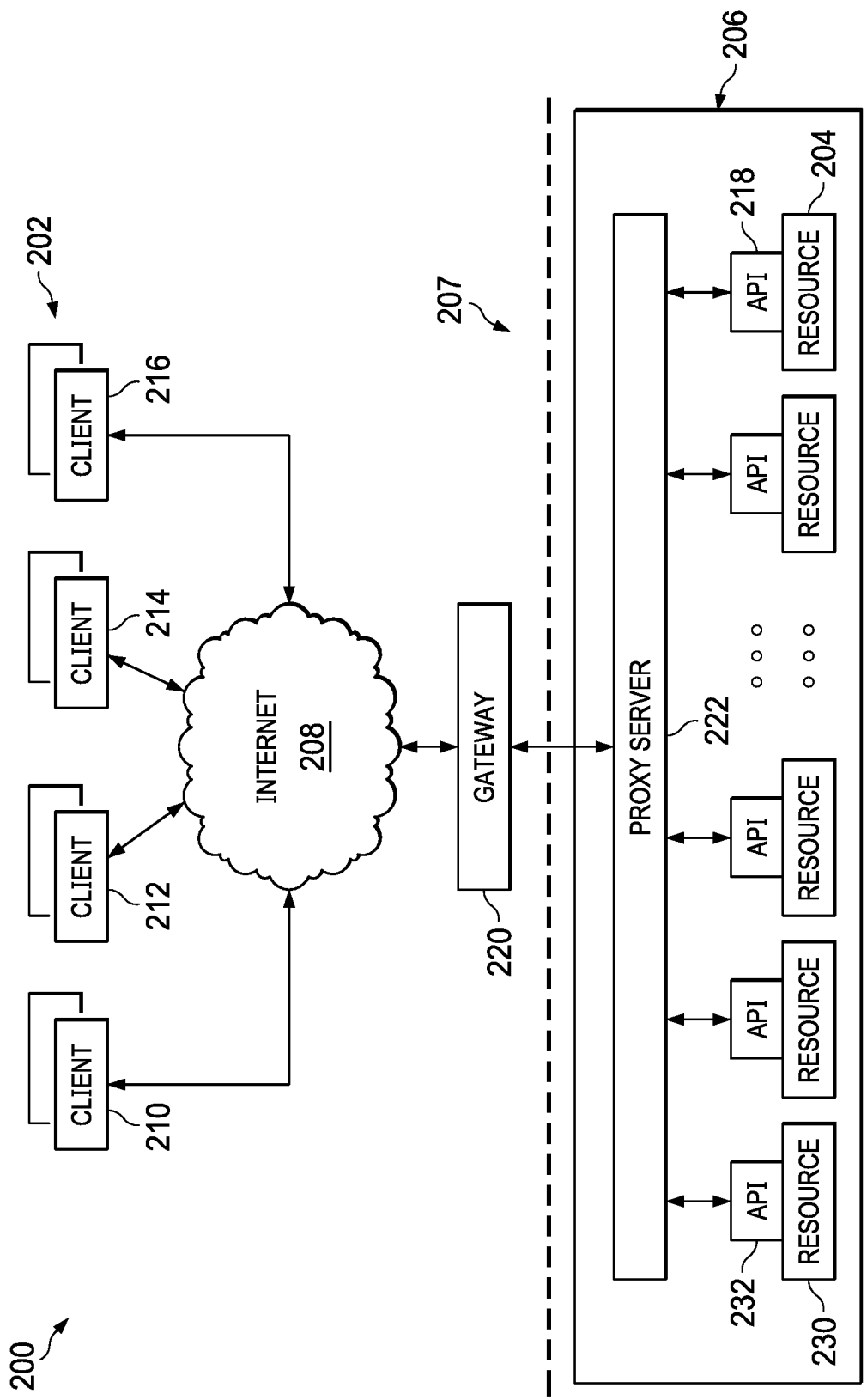
FIG. 2 is an illustration of a web services system depicted in the form of a block diagram in accordance with an illustrative embodiment.

Referring now to FIG. 2, an illustration of a web services system is depicted in the form of a block diagram in accordance with an illustrative embodiment. In this illustrative example, web services system 200 is an example of a system that enables communications between various software systems through one or more computer networks, such as network 102 of FIG. 1.

In this illustrative example, web services system 200 enables communications between plurality of clients 202 and plurality of resources 204. Each client of plurality of clients 202 may also be referred to as a service requestor. Each resource of plurality of resources 204 may also be referred to as a service provider that provides one or more services. In this manner, plurality of clients 202 and plurality of resources 204 may also be referred to as a plurality of service requestors and a plurality of service providers, respectively.

Each client of plurality of clients 202 and each resource of plurality of resources 204 may take the form of software. Further, each client in plurality of clients 202 and each resource of plurality of resources 204 may be run on one or more computer devices, such as one of client devices 110 of FIG. 1. Similarly, a resource of plurality of resources 204 may be implemented on hardware that includes at least one of a computer system, a processor unit, a microprocessor, a tablet, a laptop, a smart television, a smartphone, a server, or some other type of data processing system or electronic device.

As depicted, plurality of resources 204 may be connected to an internal network that may be in communication with Internet 208. Internet 208 may refer to the common use of the term "Internet." In some cases, Internet 208 may refer to a group of networked computers or a group of interconnected computer networks. Plurality of clients 202 may attempt to access plurality of resources 204 through Internet 208.

As depicted, plurality of clients 202 includes client 210, client 212, client 214, and client 216. Client 210, client 212, client 214, and client 216 may be affiliated with the same entity or different entities. In other illustrative examples, one or more of client 210, client 212, client 214, and client 216 may be affiliated with entity 206. In one illustrative example, each of these clients may take the form of a consumer application, an email client, a web browser, a login application, or some other type of software component.

Web services system 200 includes plurality of resources 204, plurality of interfaces 218 associated with plurality of resources 204, gateway 220, and proxy server 222. A resource in plurality of resources 204 may take the form of, for example, without limitation, a human resources service, a payroll service, an employee benefits service, a search engine, a research service provider, a governmental service provider, or some other type of service provider.

Each interface in plurality of interfaces 218 is associated with a corresponding resource of plurality of resources 204. In this illustrative example, each interface in plurality of interfaces 218 may also be referred to as an application programming interface (API). In this manner, plurality of resources 204 may also be referred to as a plurality of application programming interfaces (APIs).

Gateway 220 and proxy server 222 may be used to facilitate communications between plurality of clients 202 and plurality of resources 204. Gateway 220 and proxy server 222 may each be implemented using software, hardware, firmware, or a combination thereof. Depending on the implementation, gateway 220 and proxy server 222 may be implemented on the same computer device or on different computer devices that are in communication with each other. In this illustrative example, gateway 220 and proxy server 222 may communicate over Internet 208. However, in other illustrative examples, gateway 220 may communicate with proxy server 222 over an internal network.

In one illustrative example, client 212 may send a request for access to data provided by resource 230 over Internet 208 to gateway 220. Gateway 220 uses the request to identify interface 232 associated with resource 230. Gateway 220 then passes along the request to proxy server 222.

Proxy server 222 can perform authorization and ultimately controls access to resource 230. In particular, proxy server 222 performs a profile-based authorization for the user of client 212. Once the user of client 212 has been authorized, proxy server 222 routes the request received from client 212 to resource 230. Proxy server 222 may then receive a response that includes the requested data from resource 230. Proxy server 222 then sends this response to gateway 220, which then forwards the response to client 212 over Internet 208.

The functions performed by gateway 220 are described in greater detail below in FIG. 2. Further, the functions performed by proxy server 222 are described in greater detail below in FIG. 3.

Figure 3:
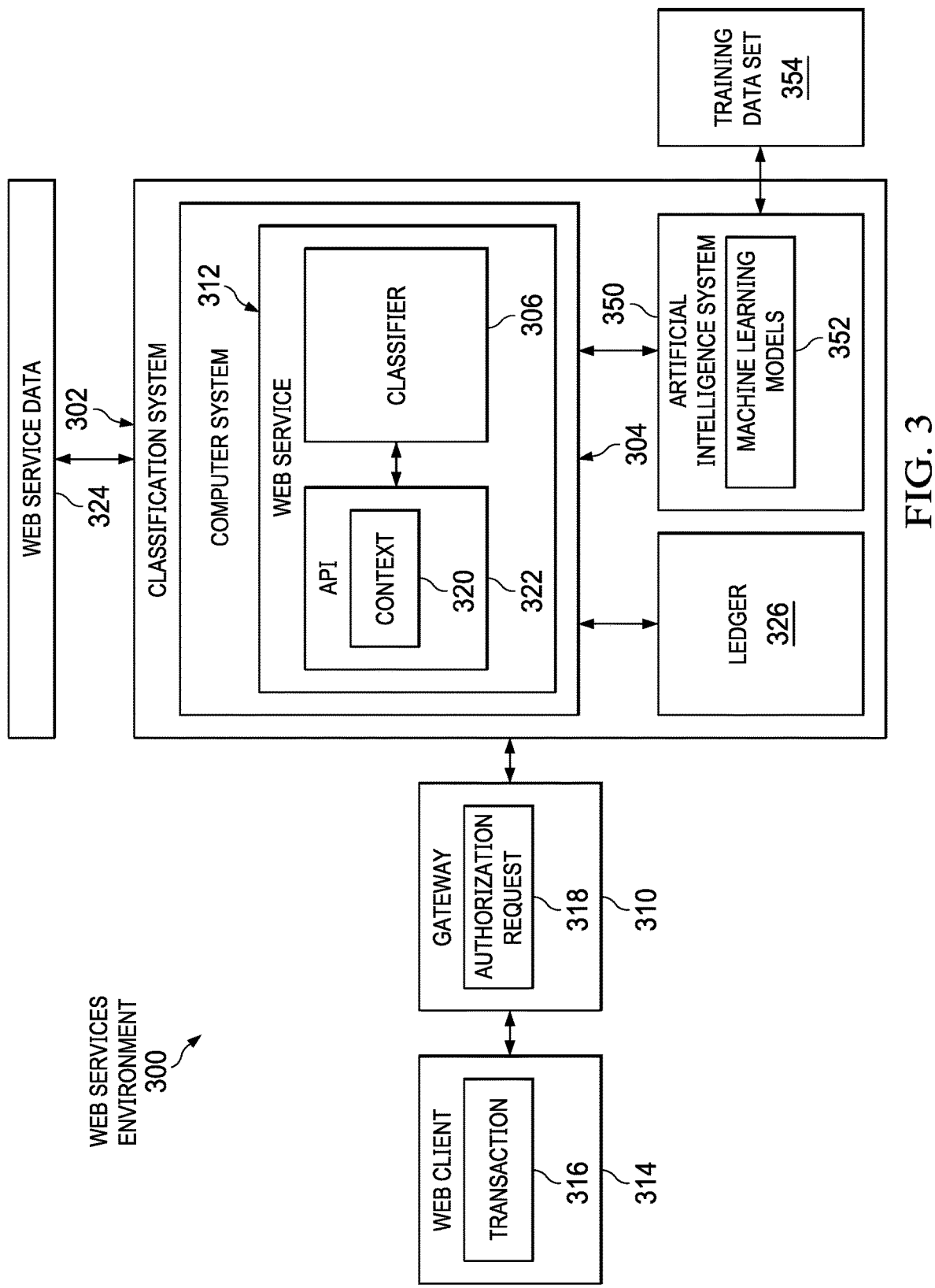
FIG. 3 is a block diagram of a web services environment depicted in accordance with an illustrative embodiment.

With reference now to FIG. 3, a block diagram of a web services environment is depicted in accordance with an illustrative embodiment. In this illustrative example, web services environment 300 includes components that can be implemented in hardware such as the hardware shown in network data processing system 100 in FIG. 1 and web services system 200 of FIG. 2.

As depicted, classification system 302 comprises computer system 304 and classifier 306. Classifier 306 runs in computer system 304. Classifier 306 can be implemented in software, hardware, firmware, or a combination thereof. When software is used, the operations performed by classifier 306 can be implemented in program code configured to run on hardware, such as a processor unit. When firmware is used, the operations performed by classifier 306 can be implemented in program code and data and stored in persistent memory to run on a processor unit. When hardware is employed, the hardware may include circuits that operate to perform the operations in classifier 306.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 304 is a physical hardware system and includes one or more data processing systems. When more than one data processing system is present in computer system 304, those data processing systems are in communication with each other using a communications medium. The communications medium can be a network. The data processing systems can be selected from at least one of a computer, a server computer, a tablet computer, or some other suitable data processing system.

In this illustrative example, classifier 306 is implemented as web service 312. Web service 312 is an example of one of plurality of resources 204 shown in block form in FIG. 2.

In this illustrative example, web service 312 in computer system 304 is configured to receive authorization request 318 from gateway 310. Gateway 310 can be, for example, gateway 220 of FIG. 2. Authorization request 318 includes data for a transaction 316 that is pending at web client 314. Authorization request 318 can be received through application programming interface (API) 322, which defines standards that enable access to Web services data 324.

Based on the authorization request 318, web service determines context 320 for accessing web service 312, including classifier 306, and web service data 324. In one illustrative example, context 320 is a security token or cookie that provides access control, limiting access of web services data to an identity context asserted within authorization request 318. For example, context 320 may be a certificate, a session identifier, a web token, an OpenID Connect OAuth token, a Security Assertion Markup Language (SAML) assertion, or some other suitable type of token. Web service 312 uses context 320 to enable fulfillment of authorization request 318.

Based on the context that was determined from authorization request 318, web service 312 provides access to web service data 324. Web service data 324 include different data dimensions that can be considered by classifier 306 when performing classification of transaction 316.

Based on the web services data that was retrieved according to context 320, classifier 306 classifies the transaction 316. Web service 312 records transaction 316 in ledger 326 according to context 320.

In some illustrative examples, classifier 306 can use artificial intelligence system 350. Artificial intelligence system 350 is a system that has intelligent behavior and can be based on the function of a human brain. An artificial intelligence system comprises at least one of an artificial neural network, a cognitive system, a Bayesian network, a fuzzy logic, an expert system, a natural language system, or some other suitable system. Machine learning is used to train the artificial intelligence system. Machine learning involves inputting data to the process and allowing the process to adjust and improve the function of the artificial intelligence system.

In this illustrative example, artificial intelligence system 350 can include a set of machine learning models 352. A machine learning model is a type of artificial intelligence model that can learn without being explicitly programmed. A machine learning model can learn based on training data input into the machine learning model. The machine learning model can learn using various types of machine learning algorithms. The machine learning algorithms include at least one of a supervised learning, an unsupervised learning, a feature learning, a sparse dictionary learning, and anomaly detection, association rules, or other types of learning algorithms. Examples of machine learning models include an artificial neural network, a decision tree, a support vector machine, a Bayesian network, a genetic algorithm, and other types of models. These machine learning models can be trained from training data set 354, and thereafter process additional data to provide a desired output.

Machine learning models 352 use classification algorithms to divide a dataset into classes based on different parameters. The task of the classification algorithm is to find a mapping function to map an input (x) to a discrete output (y), that can be binary outputs issued across many classes. In other words, classification algorithms are used to predict the discrete values for the classifications, such as Male or Female, True or False, Spam or Not Spam, etc. Types of Classification Algorithms include Logistic Regression, K-Nearest Neighbors, Support Vector Machines (SVM), Kernel SVM, Naïve Bayes, Decision Tree Classification, and Random Forest Classification. The machine learning model chooses one of those classes according to the model confidence.

In this illustrative example, machine learning models 352 can be a classification model trained on a training data set 354. In this illustrative example, training data set 354 can include web services data 324 as well as any data that is recorded in ledger 326. Using artificial intelligence system 350, Classifier 306 models a probabilistic relationship between data received in authorization request 318 and discrete classification outcomes for transaction 316. For example, classifier 306 may classify transaction 316 as an allowed transaction, or a disallowed transaction.

In one illustrative example, machine learning models 352 classify transaction 316 the transaction according to a risk analysis of the transaction 316 based on the web services data 324 and any prior transactions recorded in ledger 326. If the transaction is allowed by classifier 306, web service 312 can record transaction 316 in ledger 326, where it can be accessed and considered when providing additional web services.

Computer system 304 can be configured to perform at least one of the steps, operations, or actions described in the different illustrative examples using software, hardware, firmware, or a combination thereof. As a result, computer system 304 operates as a special purpose computer system in classifier 306 in computer system 304. In particular, classifier 306 transforms computer system 304 into a special purpose computer system as compared to currently available general computer systems that do not have classifier 306. In this example, computer system 304 operates as a tool that can increase at least one of speed, accuracy, or usability of classifying transactions received from a web client.

The illustration of web services environment 300 in FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 4:
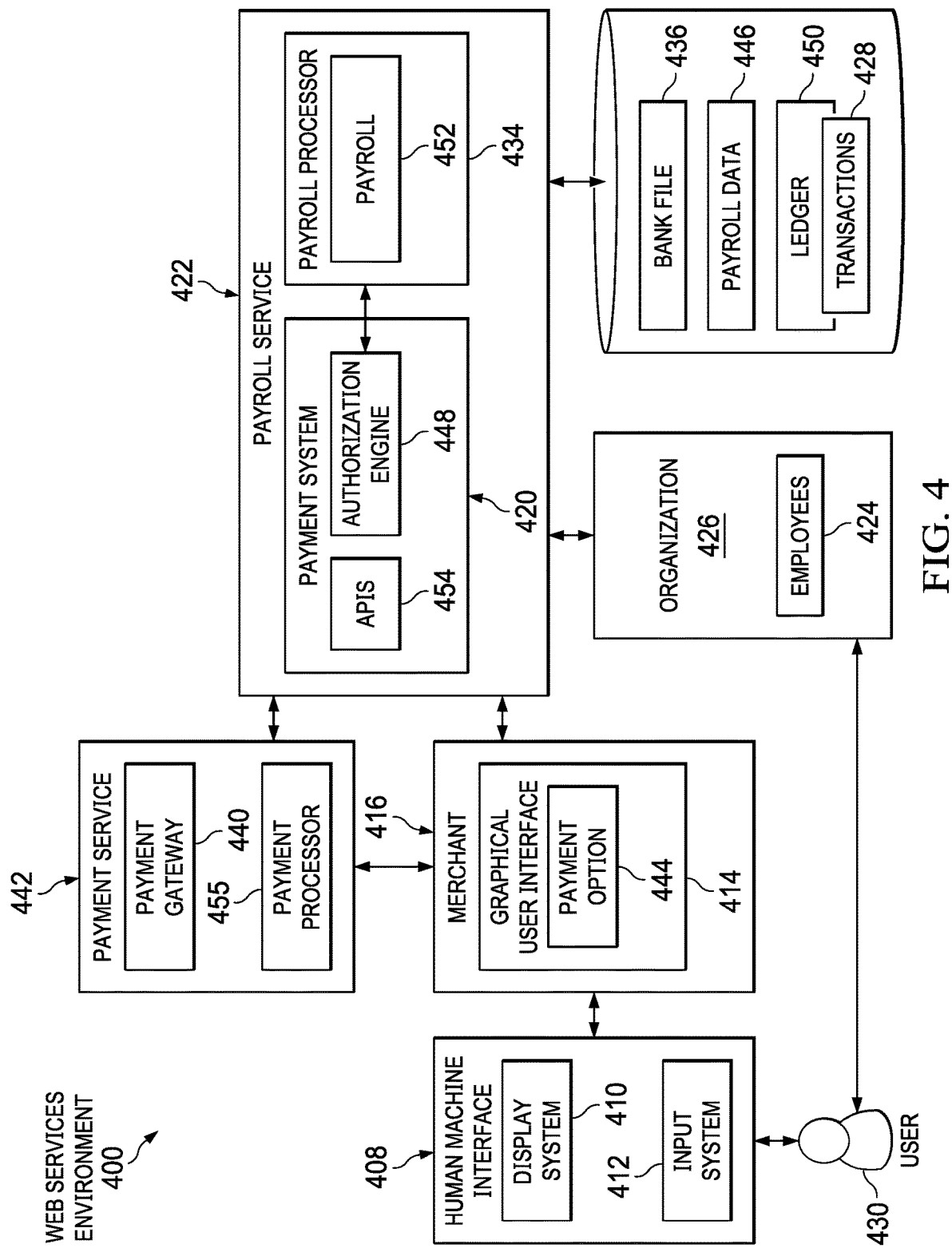
FIG. 4 is a block diagram of a web services environment is illustrated in an electronic commerce use case depicted in accordance with an illustrative embodiment.

With reference now to FIG. 4, a block diagram of a web services environment is illustrated in an electronic commerce use case and is depicted in accordance with an illustrative embodiment. In this illustrative example, web services environment 400 includes components that can be implemented as one use case example for the components of web services environment 300 of FIG. 3.

In this illustrative example, payment system 420 is an example of web service 312 of FIG. 3. Payment system 420 is a payroll-based payment system provided, for example by a payroll service provider, in connection with payroll service 422.

Payroll service 422 is a software service that is configured automatically to process payroll 452 for employees 424 of organization 426, including transactions 428 for electronic commerce between user 430, who is one of employees 424, and merchant 416. Payroll processor 434 of payroll service 422 may be configured automatically to perform any appropriate payroll processing functions. For example, without limitation, payroll processor 434 may automatically generate pay slips for employees 424, and bank file 436. Bank file 436 may include pay-out instructions to a financial institution for payment of funds to employees 424 and merchant 416.

In this use case example, payment gateway 440 is an example of gateway 310 of FIG. 3, maintained by a payment service 442. Payment service 442, also sometimes referred to as a payment service provider or PSP, is a third-party payment processing service that enables merchant 416 to access electronic payments, such as credit cards, digital wallets, and payment system 420. Payment gateway 440 directs transactions received from merchant 416 to a corresponding payment endpoint based on a payment option 444 selected from graphical user interface 414 during checkout.

As depicted, display system 410 is a physical hardware system and includes one or more display devices on which graphical user interface 414 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

User 430 can interact with graphical user interface 414 through user input generated by input system 412 for computer system 404. Input system 412 is a physical hardware system and can be selected from at least one of a mouse, a keyboard, a trackball, a touchscreen, a stylus, a motion sensing input device, a gesture detection device, a cyber glove, or some other suitable type of input device.

Collectively, display system 410 and input system 412 comprise human machine interface 408. In this illustrative example, human machine interface 408 can enable user 430 to interact with one or more computers or other types of computing devices in computer system 404. For example, these computing devices can be client devices such as client devices 110 in FIG. 1.

In one illustrative example for this particular use case, payroll service 422 generates an electronic image associated with payment system 420 and makes the electronic image available to the payment service 442 for presentation by payment processor 455 in a graphical user interface 414 of merchant 416.

During checkout, graphical user interface 414 presents a number of payment options in the graphical user interface. The number of payment options include an option for payroll payment provided by payment system 420 and indicated by the electronic image generated by payroll service 422. In response to a user selection of the option for payment system 420, user 430 can indicate a context for accessing the account of user 430 with the payroll service 422, such as by providing login credentials, a security token or Tietzenie that uniquely identifies user 430 within payroll service 422. Merchant 416 then generates an authorization request and forwards the authorization request to the payment gateway 440.

In one or more illustrative embodiments, graphical user interface 414 solves problems of prior graphical user interface devices (GUIs), in the context of electronic commerce, relating to speed, accuracy, and usability. Rather than reciting a mathematical algorithm, a fundamental economic or longstanding commercial practice, or a challenge in business, graphical user interface 414 improves on existing graphical user interface devices that do not have a pre-electronic trading analog. The embodiments of graphical user interface 414 provide significantly more than prior graphical user interface devices that merely allow for setting, displaying, and selecting data or information that is visible on a graphical user interface device. Instead, graphical user interface 414 utilizes a specific, structured interface that is directly related to a prescribed functionality that resolves a specifically identified problem of providing a payroll-based payment system.

Furthermore, the specific structure and concordant functionality of graphical user interface 414 distinguishes this system as compared to conventional computer implementations of known procedures. The function of graphical user interface 414 is not simply the generalized use of a computer system as a tool to conduct a known or obvious process. Instead, graphical user interface 414 provides an inventive concept that allows user 430 to perform electronic commerce transactions using expected payroll payments. Rather than the routine or conventional use of computers on the Internet, graphical user interface 414 overcomes problems that are necessarily rooted in computer technology and that specifically arise in the realm of computer networks, resulting in an improvement to the capabilities of a computer system that implements payment system 420.

In this illustrative example, human machine interface 408 can enable user 430 to interact with one or more computers or other types of computing devices in computer system 404. For example, these computing devices can be client devices such as client devices 110 in FIG. 1.

When payment system 420 receives an authorization request, such as authorization request 318 of FIG. 3, payment system 420 identifies an account of user with payroll service 422 based on the context identified from the authorization request. In this use case, the identity of user 430 provides the context for accessing payroll data 446 associated with the user.

In this use case, authorization engine 448 is an example of classifier 306 of FIG. 3. Authorization engine 448 may perform a risk analysis for a pending transaction. The risk analysis may be based on payroll data 446 accessed through one or more APIs 454. In this illustrative example, payroll data 446 includes information about user 430 in the employment context with organization 426. For example, payroll data 446 may include information Such as but not limited to, Results from previous transactions, a transaction/income-ratio, income stability, company tenure, absence patterns, time and attendance patterns, garnishments, employee performance; time to pay-out of payroll, organization liquidity, and similarity profiling.

Based on the payroll data 446 of the user 430, authorization system 448 Classifies a transaction. For example, authorization system 448 may classify the transaction as "allowed" or "disallowed" based on payroll data 446 of user 430 and transactions 428 recorded in ledger 450. Payment system 420 records allowed transactions in ledger 450, where they can be accessed by payroll processor 434.

Sometime thereafter, payroll processor 434 performs payroll for an organization 426, including determining pay to employees 424 based on the payroll data 446 as well as transactions 428 recorded in ledger 450. For example, after determining a net pay to user 430, payroll processor 434 identifies transactions 428, including amounts thereof, recorded in ledger 450. Payroll processor 434 deducts any transaction amounts from the net pay to determine a balance.

Payroll processor 434 generates bank file 436. Bank file 436 includes a payment of the transaction amounts to merchant 416, and a payment of the balance to user 430. Payroll service 422 forwards bank file 436 to organization 426, thereby facilitating a deposit of transaction amounts into an account of the merchant 416 and a deposit of the balance into an account of user 430.

Figure 5:
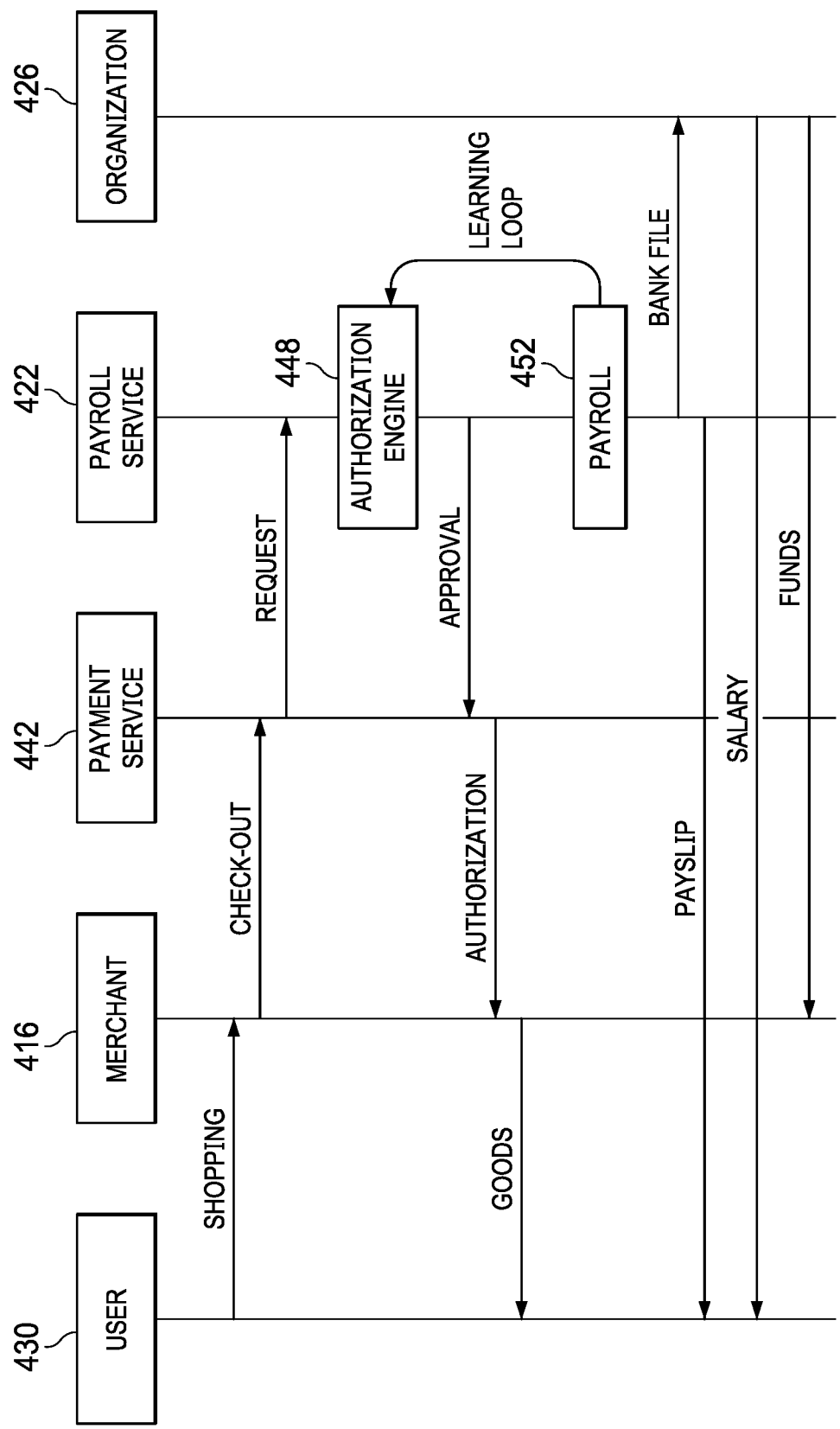
FIG. 5 is a data flow for classifying transactions in a web services environment is illustrated depicted in accordance with an illustrative embodiment.

Referring now to FIG. 5, a data flow for classifying transactions in a web services environment is illustrated is depicted in accordance with an illustrative embodiment. In this use case example, data flow 500 includes components that can be implemented as the use case example for shown in FIG. 4.

As depicted, user 430 engages in electronic commerce with merchant 416. At checkout, merchant 416 forwards the transaction to payment service 442 for payment processing.

Upon receipt of the transaction, payment service 442 sends an authorization request to payroll service 422. Authorization engine 448 classifies the request as "allowed" or "disallowed," and returns a result to payment service 442. The results of the classification in a subsequent run of payroll 452 can be used in a feedback algorithm to further train or refine a machine learning algorithm used by authorization engine 448. Authorization is returned to merchant 416, who then releases the goods to user 430.

Sometime thereafter, payroll service 422 runs payroll 452, generating a bank file that is sent to organization 426, and a pay slip that can be sent to user 430. Organization 426 then submits payments of transaction amounts to merchant 416 and a balance to user 430.

The illustrations in FIGS. 3-5 are provided as one illustrative example of an implementation for classifying transactions and are not meant to limit the manner in which the transactions can be generated, classified, and presented in other illustrative examples. Further, other illustrative examples can include many additional steps in addition to those shown in depicted in FIGS. 3-5.

Figure 6:
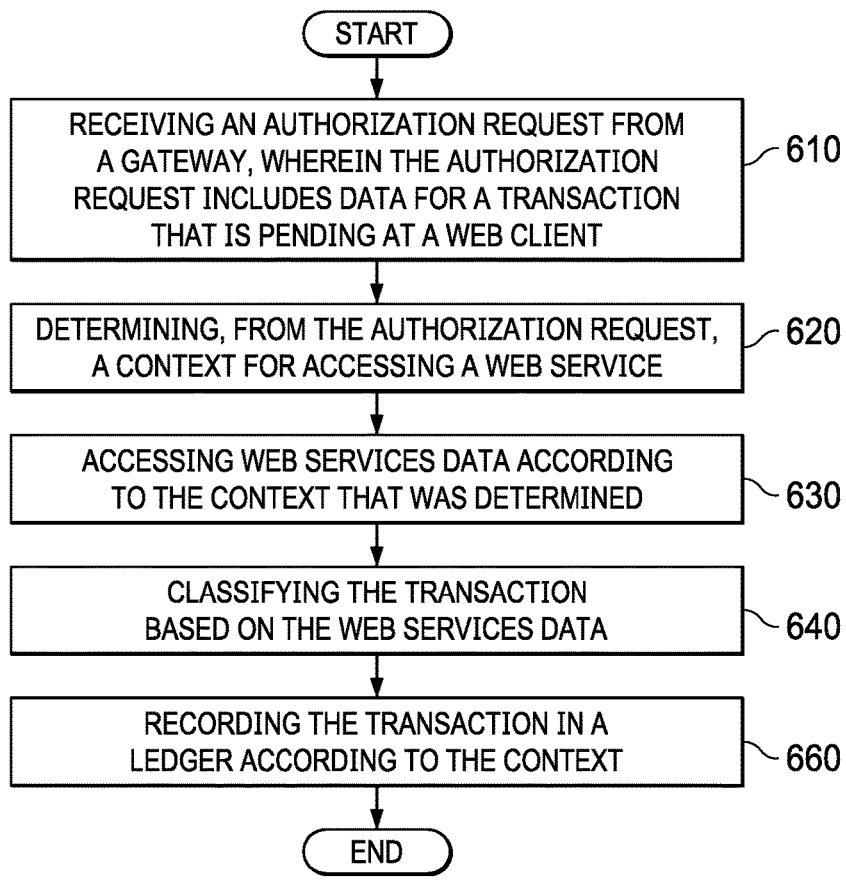
FIG. 6 is a flowchart of a process for classifying a transaction depicted in accordance with an illustrative embodiment.

Turning next to FIG. 6, a flowchart of a process for classifying a transaction is depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process can be implemented in web service 312 in computer system 304 in FIG. 3.

The process begins by receiving an authorization request from a gateway, wherein the authorization request includes data for a transaction that is pending at a web client (step 610). Based on the authorization request, the process determines a context for accessing a web service (step 620), and accesses web services data according to the context that was determined (step 630).

Based on the web services data, the process classifies the transaction (step 640), and records the transaction in a ledger according to the context (step 650). Thereafter, the process terminates.

Figure 7:
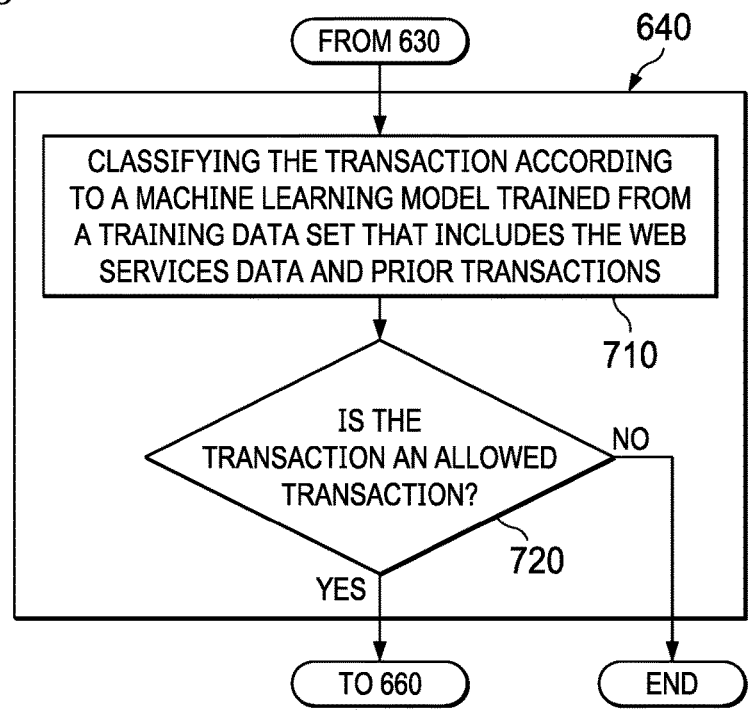
FIG. 7 is a flowchart of additional processing steps for classifying a transaction depicted in accordance with an illustrative embodiment.

With reference next to FIG. 7, a flowchart of additional processing steps for classifying a transaction is depicted in accordance with an illustrative embodiment. The process in FIG. 7 is an example for one implementation of step 640 in FIG. 6.

Continuing from step 630, the process classifies the transaction according to a machine learning model trained from a training data set that includes the web services data and prior transactions (step 710). In this illustrative example, the transaction may be classified as an "allowed" or "disallowed" transaction. The machine learning model may classify the transaction according to a risk analysis of the transaction based on the web services data and prior transactions recorded in the ledger.

The process determines whether the transaction is an allowed transaction (step 720). In response to classifying the transaction as an allowed transaction ("yes" at step 720), the process proceeds to step 660 of FIG. 6 and records the transaction into the ledger. However, if the transaction is disallowed ("no" at step 720), the process terminates. A response denying of the authorization request may be remitted, or the request may simply be allowed to timeout.

Figure 8:
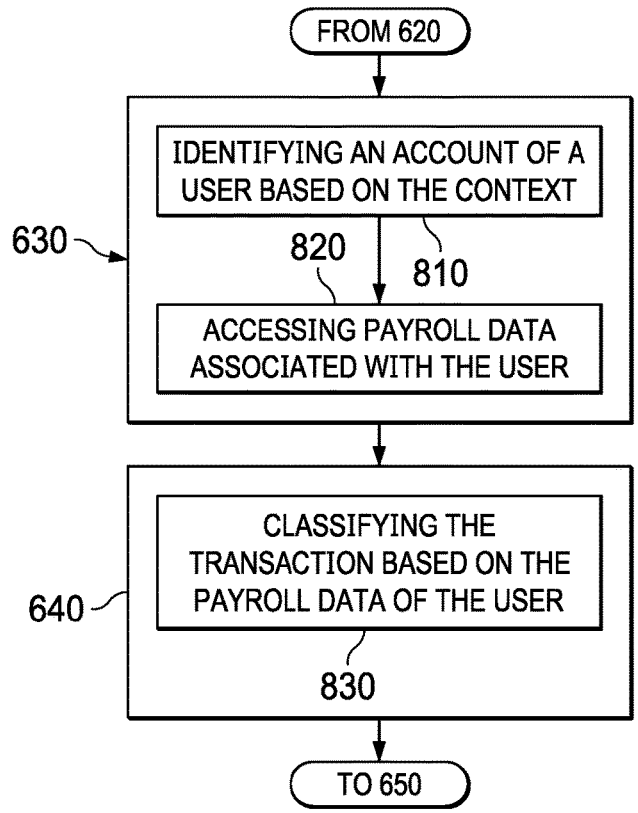
FIG. 8 is a flowchart of a process for classifying a transaction depicted for and electronic commerce use case in accordance with an illustrative embodiment.

With reference next to FIG. 8, a flowchart of a process for classifying a transaction is depicted for an electronic commerce use case in accordance with an illustrative embodiment. The process in FIG. 8 is an example one implementation for process steps 630 and 640 in FIG. 6, implemented in web services environment 400 of FIG. 4. For example, the process can be implemented in payment system 420 in payroll service 422 in FIG. 4.

In this illustrative example, the gateway is a payment gateway maintained by a payment service provider, and the web service is a payroll-based payment service provided by a payroll service provider. Continuing from step 620, the process identifies an account of a user based on the context (step 810). The process accesses payroll data associated with the user (step 820), and classifies the transaction based on the payroll data of the user (step 830). Thereafter, the process continues to step 650 of FIG. 6.

Figure 9:
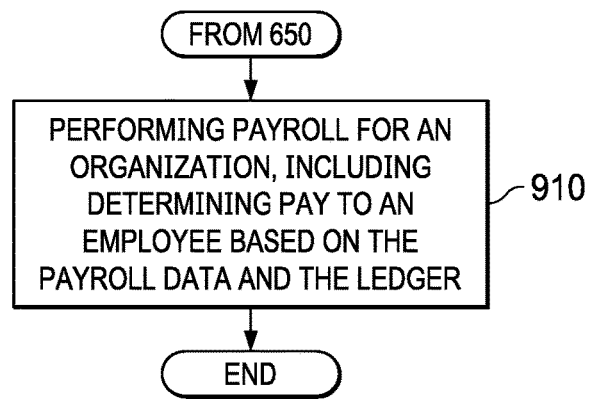
FIG. 9 is a flowchart of a process for performing payroll depicted in accordance with an illustrative embodiment.

With reference next to FIG. 9, a flowchart of a process for performing payroll is depicted in accordance with an illustrative embodiment. The process in FIG. 7 is an example of additional processing steps that can be implemented in conjunction with the process of FIG. 6, according to a particular use case.

Continuing from step 650, the process performs payroll for an organization, including determining pay to an employee based on the payroll data and the ledger (step 910). Thereafter, the process terminates.

Figure 10:
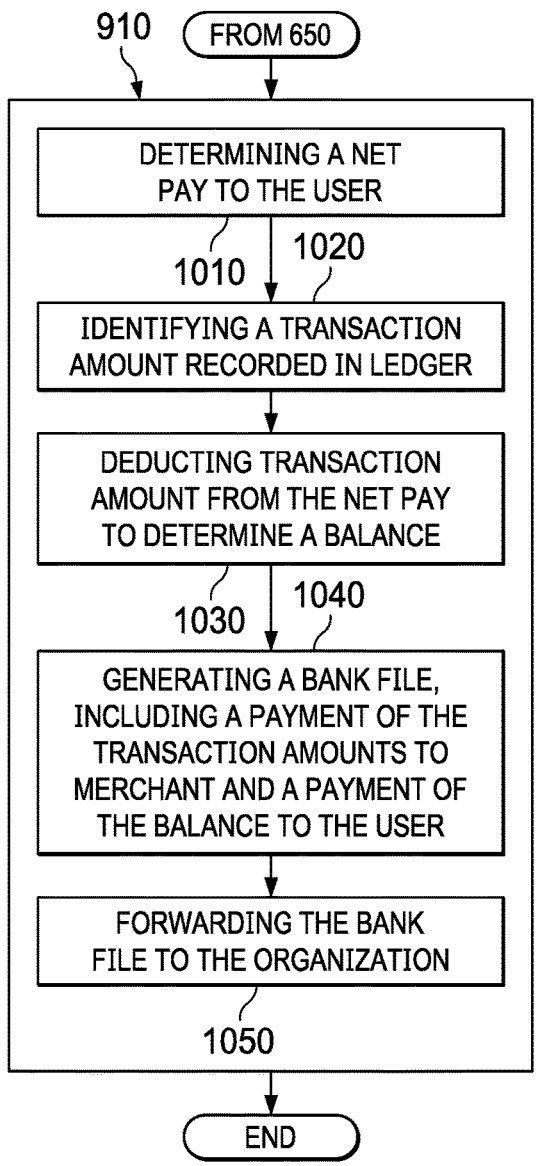
FIG. 10 is a flowchart of a process for performs payroll depicted in accordance with an illustrative embodiment.

With reference next to FIG. 10, a flowchart of a process for performing payroll is depicted in accordance with an illustrative embodiment. The process in FIG. 10 is an example one implementation for step 910 in FIG. 9. For example, the process can be implemented in payroll processor 434 in payroll service 422 in FIG. 4.

Continuing from step 650, the process determines a net pay to the user (step 1010). The process identifies a transaction amount recorded in ledger (step 1020) and deducts the transaction amount from the net pay to determine a balance (step 1030).

The process generates a bank file, including a payment of the transaction amounts to merchant and a payment of the balance to the user (step 1040). The process forwards the bank file to the organization (step 1050), thereby facilitating a deposit of transaction amounts into an account of the merchant and a deposit of the balance into an account of user. The process terminates thereafter.

Figure 11:
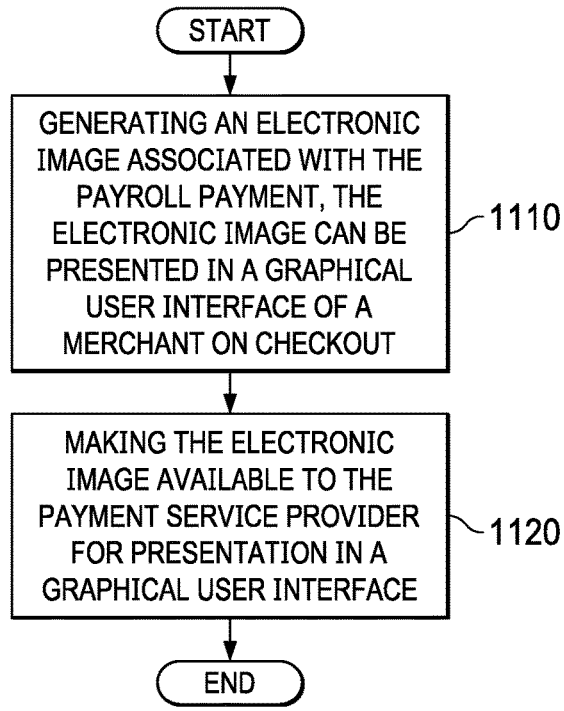
FIG. 11 is a flowchart of a process for presenting a payroll payment option depicted in accordance with an illustrative embodiment.

With reference next to FIG. 11, a flowchart of a process for presenting a payroll payment option is depicted in accordance with an illustrative embodiment. The process in FIG. 11 can be implemented in hardware, software, or both. When implemented in software, the process can take the form of program code that is run by one or more processor units located in one or more hardware devices in one or more computer systems. For example, the process can be implemented in one or more of payment system 420, payment service 442, and graphical user interface 414 in FIG. 4.

The process generates an electronic image associated with the payroll payment. The electronic image can be presented in a graphical user interface of a merchant on checkout (step 1110). The process makes the electronic image available to the payment service provider for presentation in a graphical user interface (step 1120). Thereafter, the process terminates.

Figure 12:
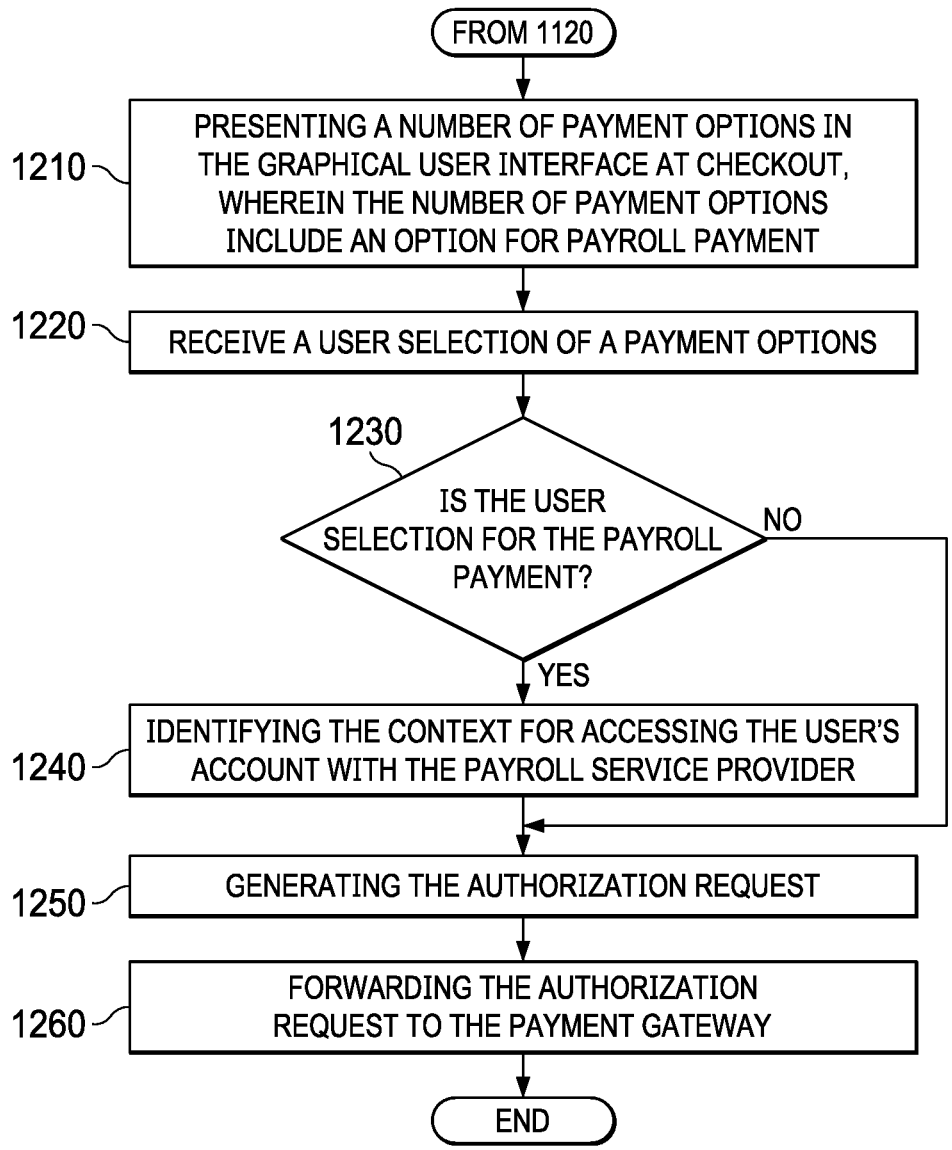
FIG. 12 is a flowchart of a process for generating an authorization request depicted in accordance with an illustrative embodiment.

With reference next to FIG. 12, a flowchart of a process for generating an authorization request is depicted in accordance with an illustrative embodiment. The process in FIG. 12 can be implemented in conjunction with process 1100 of FIG. 11.

Continuing from step 1120, the process presents a number of payment options in the graphical user interface at checkout, wherein the number of payment options include an option for payroll payment (step 1210). Sometime thereafter, the process may receive a user selection of a payment option (step 1220) and determines whether the selection is for a payroll payment (step 1130).

A web service for a different payment option, i.e., not a payroll payment service, may be identified, and an authorization request routed to the associated endpoint. In response to a user selection of the option for the payroll payment ("yes" at step 1230), the process identifies the context for accessing the user's account with the payroll service provider (step 1240). The process generates the authorization request (step 1250) and forwards the authorization request to the payment gateway (step 1260).

Returning to step 1230, In response to determining that the user selection is not for the payroll payment ("no" at step 1230), the process may proceed directly to step 1250. The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 13:
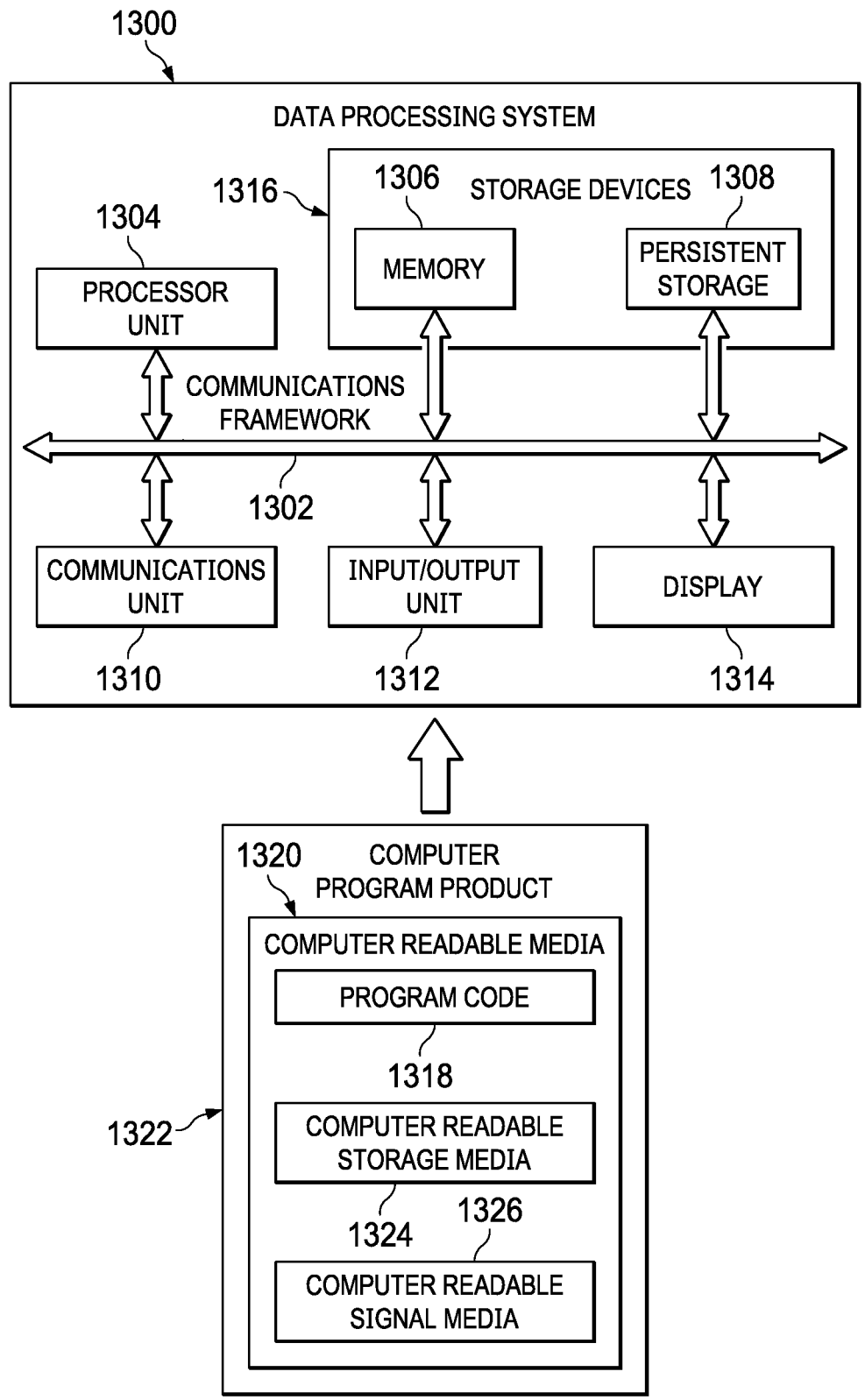
FIG. 13 is a block diagram of a data processing system in accordance with an illustrative embodiment.

Turning now to FIG. 13, a block diagram of a data processing system is depicted in accordance with an illustrative embodiment. Data processing system 1300 can be used to implement server computer 104, server computer 106, client devices 110, in FIG. 1. Data processing system 1300 can also be used to implement computer system 304 in FIG. 3. In this illustrative example, data processing system 1300 includes communications framework 1302, which provides communications between processor unit 1304, memory 1306, persistent storage 1308, communications unit 1310, input/output (I/O) unit 1312, and display 1314. In this example, communications framework 1302 takes the form of a bus system.

Processor unit 1304 serves to execute instructions for software that can be loaded into memory 1306. Processor unit 1304 includes one or more processors. For example, processor unit 1304 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1304 can may be implemented using one or more heterogeneous processor systems in which a main processor is present with secondary processors on a single chip. As another illustrative example, processor unit 1304 can be a symmetric multi-processor system containing multiple processors of the same type on a single chip.

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer-readable storage devices in these illustrative examples. Memory 1306, in these examples, can be, for example, a random-access memory or any other suitable volatile or non-volatile storage device. Persistent storage 1308 may take various forms, depending on the particular implementation.

For example, persistent storage 1308 may contain one or more components or devices. For example, persistent storage 1308 can be a hard drive, a solid-state drive (SSD), a flash memory, a rewritable optical disk, a rewritable magnetic tape, or some combination of the above. The media used by persistent storage 1308 also can be removable. For example, a removable hard drive can be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that can be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs can be located in storage devices 1316, which are in communication with processor unit 1304 through communications framework 1302. The processes of the different embodiments can be performed by processor unit 1304 using computer-implemented instructions, which may be located in a memory, such as memory 1306.

These instructions are program instructions and are also referred are referred to as program code, computer usable program code, or computer-readable program code that can be read and executed by a processor in processor unit 1304. The program code in the different embodiments can be embodied on different physical or computer-readable storage media, such as memory 1306 or persistent storage 1308.

Program code 1318 is located in a functional form on computer-readable media 1320 that is selectively removable and can be loaded onto or transferred to data processing system 1300 for execution by processor unit 1304. Program code 1318 and computer-readable media 1320 form computer program product 1322 in these illustrative examples. In the illustrative example, computer-readable media 1320 is computer-readable storage media 1324.

In these illustrative examples, computer-readable storage media 1324 is a physical or tangible storage device used to store program code 1318 rather than a medium that propagates or transmits program code 1318. Computer-readable storage media 1324, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. The term "non-transitory" or "tangible", as used herein, is a limitation of the medium itself (i.e., tangible, not a signal) as opposed to a limitation on data storage persistency (e.g., RAM vs. ROM).

Alternatively, program code 1318 can be transferred to data processing system 1300 using a computer-readable signal media. The computer-readable signal media are signals and can be, for example, a propagated data signal containing program code 1318. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media" can be singular or plural. For example, program code 1318 can be located in computer-readable media 1320 in the form of a single storage device or system. In another example, program code 1318 can be located in computer-readable media 1320 that is distributed in multiple data processing systems. In other words, some instructions in program code 1318 can be located in one data processing system while other instructions in program code 1318 can be located in one data processing system. For example, a portion of program code 1318 can be located in computer-readable media 1320 in a server computer while another portion of program code 1318 can be located in computer-readable media 1320 located in a set of client computers.

The different components illustrated for data processing system 1300 are not meant to provide architectural limitations to the manner in which different embodiments can be implemented. In some illustrative examples, one or more of the components may be incorporated in or otherwise form a portion of, another component. For example, memory 1306, or portions thereof, may be incorporated in processor unit 1304 in some illustrative examples. The different illustrative embodiments can be implemented in a data processing system including components in addition to or in place of those illustrated for data processing system 1300. Other components shown in FIG. 13 can be varied from the illustrative examples shown. The different embodiments can be implemented using any hardware device or system capable of running program code 1318.

Thus, the illustrative embodiments of the present invention provide a computer-implemented method, computer system, and computer program product for classifying transactions. As a result, the illustrative examples can provide a classification service that can be configured to perform at least one of the steps, operations, or actions described herein. As a result, the illustrative embodiments described herein operate as a special purpose computer system when implemented with the described classification system, transforming a currently available general computer system into a special purpose computer system as compared to one that does not have the described classifier. For example, the embodiments described herein enable the computer system that can increase at least one of speed, accuracy, or usability of classifying transactions received from a web client.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for classifying a transaction, the method comprising:
   generating, by a payroll service executed by a payroll-based payment system comprising one or more processors coupled with memory, an electronic image associated with an option to pay from payroll in a pending transaction at a web client, wherein the payroll service performs payroll for an organization, including:
      determining net pay for one or more accounts associated with the organization;
      determining a balance for the respective one or more accounts based on a respective transaction amount deducted from the respective net pay for the one or more accounts; and
      providing, to the organization, an indication of the balance for the respective one or more accounts;
   presenting, by the payroll service, via a graphical user interface, the electronic image associated with the option to pay from payroll for the pending transaction at the web client via a gateway maintained by a payment service provider;
   receiving, by the payroll service via the graphical user interface, a selection of the electronic image associated with the option to pay from payroll;
   receiving, by the payroll service, responsive to the selection of the electronic image associated with the option to pay from payroll, via the gateway, a request for authorization to access data of the pending transaction at the web client;
   determining, by the payroll service, from the request for authorization, a token for accessing the payroll-based payment system;
   providing, by the payroll service, the token to the gateway to cause the gateway to identify, using the token, web services data and payroll data of an account of the payroll service, wherein the token enables completion of the request for authorization transmitted by the gateway responsive to the selection of the electronic image associated with the option to pay from payroll;
   determining, by the payroll service, a risk of the pending transaction by providing the web services data and the payroll data of the account of the payroll service to a machine learning model trained, using historic web services data, to model a probabilistic relationship between the historic web services data and risks;
   classifying, by the payroll service, using the machine learning model and based on the payroll data, the pending transaction as an allowed transaction according to the risk determined by the machine learning model;
   recording, by the payroll service, responsive to classifying the pending transaction as the allowed transaction, the pending transaction in a ledger according to the token; and
   executing, by the payroll service, responsive to classifying the pending transaction as the allowed transaction, the pending transaction.

2. The method of claim 1, wherein the machine learning model classifies the pending transaction according to a risk analysis of the pending transaction based on the web services data and prior transactions recorded in the ledger.

3. The method of claim 1, wherein the web services data is provided by a provider of the payroll service, the method further comprising:
   identifying the account based on the token; and
   accessing the payroll data associated with the account.

4. The method of claim 3, further comprising:
   performing payroll for the organization, including determining pay based on the payroll data and the ledger.

5. The method of claim 4, wherein performing payroll further comprises:
   determining a net pay to a user of the account;
   identifying a transaction amount recorded in the ledger;
   deducting the transaction amount from the net pay to determine a balance;
   generating a bank file, including a payment of the transaction amount to a merchant and a payment of the balance to the user; and
   forwarding the bank file to the organization.

6. The method of claim 5, further comprising:
   facilitating a deposit of the transaction amount into an account of the merchant; and
   facilitating a deposit of the balance into the account of the user.

7. The method of claim 3, further comprising:
   identifying, responsive to a user selection of the electronic image associated with the option to pay from payroll, context for accessing the account with the provider of the payroll service;
   generating the request for authorization; and
   forwarding the request for authorization to the gateway.

8. A system comprising:
   a data processing system comprising a processor, coupled with memory, to:

generate an electronic image associated with an option to pay from payroll in a pending transaction at a web client;
present, via a graphical user interface, the electronic image associated with the option to pay from payroll for the pending transaction at the web client via a gateway maintained by a payment service provider;
receive, via the graphical user interface, a selection of the electronic image associated with the option to pay from payroll;
receive, responsive to the selection of the electronic image associated with the option to pay from payroll, via the gateway maintained by the payment service provider, a request for authorization to access data of the pending transaction at the web client;
determine, from the request for authorization, a token for accessing a payroll-based payment system that executes a payroll service, wherein the payroll service performs payroll for an organization, including:
    determining net pay for one or more accounts associated with the organization;
    determining a balance for the respective one or more accounts based on a respective transaction amount deducted from the respective net pay for the one or more accounts; and
    providing, to the organization, an indication of the balance for the respective one or more accounts;
provide the token to the gateway to cause the gateway to identify, by the token, web services data and payroll data of an account of the payroll service, wherein the token enables completion of the request for authorization transmitted by the gateway responsive to the selection of the electronic image associated with the option to pay from payroll;
determine a risk of the pending transaction by providing the web services data and the payroll data of the account of the payroll service to a machine learning model trained , using historic web services data, to model a probabilistic relationship between the historic web services data and risks;
classify, using the machine learning model, based on the payroll data, the pending transaction as an allowed transaction according to the risk determined by the machine learning model;
record, responsive to classifying the pending transaction as the allowed transaction, the pending transaction in a ledger according to the token; and
execute, responsive to the classifying the pending transaction as the applied transaction, the pending transaction.

9. The system of claim 8, wherein the machine learning model classifies the pending transaction according to a risk analysis of the pending transaction based on the web services data and prior transactions recorded in the ledger.

10. The system of claim 8, wherein the web services data is provided by a provider of the payroll service, comprising the data processing system to:
identify the account based on the token; and
access the payroll data associated with the account.

11. The system of claim 10, comprising the data processing system to:
perform payroll for the organization, including determining pay based on the payroll data and the ledger.

12. The system of claim 11, comprising the data processing system to:
determine a net pay to an employee;
identify a transaction amount recorded in the ledger;
deduct the transaction amount from the net pay to determine a balance;
generate a bank file, including a payment of the transaction amounts to merchant and a payment of the balance to the employee; and
forward the bank file to the organization.

13. The system of claim 12, comprising the data processing system to:
facilitate a deposit of the transaction amount into an account of the merchant; and
facilitate a deposit of the balance into the account of the employee.

14. The system of claim 10, comprising the data processing system to:
identify, responsive to a user selection of the electronic image associated with the option to pay from payroll, context for accessing the account with the provider of the payroll service;
generate the request for authorization; and
forward the request for authorization to the gateway.

15. A non-transitory computer program product comprising:
a non-transitory computer readable storage media; and
program code, stored on the non-transitory computer readable storage media, for classifying a transaction, and when executed, instruct a computer system to perform a method of:
    generate an electronic image associated with an option to pay from payroll in a pending transaction at a web client;
    present, via a graphical user interface, the electronic image associated with the option to pay from payroll for the pending transaction at the web client via a gateway maintained by a payment service provider;
    receive, via the graphical user interface, a selection of the electronic image associated with the option to pay from payroll; and
    receive, responsive to the selection of the electronic image associated with the option to pay from payroll, via the gateway maintained by the payment service provider, a request for authorization to access data of the pending transaction at the web client;
    determine, from the request for authorization, a token for accessing a payroll-based payment system that executes a payroll service,, wherein the payroll service performs payroll for an organization, including:
        determining net pay for one or more accounts associated with the organization;
        determining a balance for the respective one or more accounts based on a respective transaction amount deducted from the respective net pay for the one or more accounts; and
        providing, to the organization, an indication of the balance for the respective one or more accounts;
    provide the token to the gateway to cause the gateway to identify, by the token, web services data and payroll data of an account of the payroll service, wherein the token enables completion of the request for authorization transmitted by the gateway responsive to the selection of the electronic image associated with the option to pay from payroll;
    determine a risk of the pending transaction by providing the web services data and the payroll data of the account of the payroll service a machine learning model, using historic web services data, to model a probabilistic relationship between the historic web services data and risks;

classify, using the machine learning model, based on the payroll data, the pending transaction as an allowed transaction according to the risk determined by the machine learning model;

record, responsive to classifying the pending transaction as the allowed transaction, the pending transaction in a ledger according to the token; and determine, by the payroll service, to pay to the account of the payroll service based on the pending transaction recorded in the ledger.

16. The non-transitory computer program product of claim 15, wherein the machine learning model classifies the pending transaction according to a risk analysis of the pending transaction based on the web services data and prior transactions recorded in the ledger.

17. The non-transitory computer program product of claim 15, wherein the web services data is provided by a provider of the payroll service, and the program code further comprises instructions to:

identify an account of a user based on the token;

access payroll data associated with the user; and classify the transaction based on the payroll data of the user.

18. The non-transitory computer program product of claim 17, wherein the program code further comprises instructions to:

perform payroll for the organization, including determining to pay based on the payroll data and the ledger.

19. The non-transitory computer program product of claim 18, wherein the program code further comprises instructions to:

determine a net pay to the user;

identify a transaction amount recorded in the ledger;

deduct the transaction amount from the net pay to determine a balance;

generate a bank file, including a payment of the transaction amount to merchant and a payment of the balance to the user; and forward the bank file to the organization.

20. The non-transitory computer program product of claim 19, wherein the program code further comprises instructions to:

facilitate a deposit of the transaction amount into an account of the merchant; and facilitate a deposit of the balance into an account of the user.

21. The non-transitory computer program product of claim 17, wherein the program code further comprises instructions to:

identify, responsive to a user selection of the electronic image associated with the option to pay from payroll, context for accessing the account of the user with the provider of the payroll service;

generate the request for authorization; and forward the request for authorization to the gateway.

* * * * *